Figure 1:
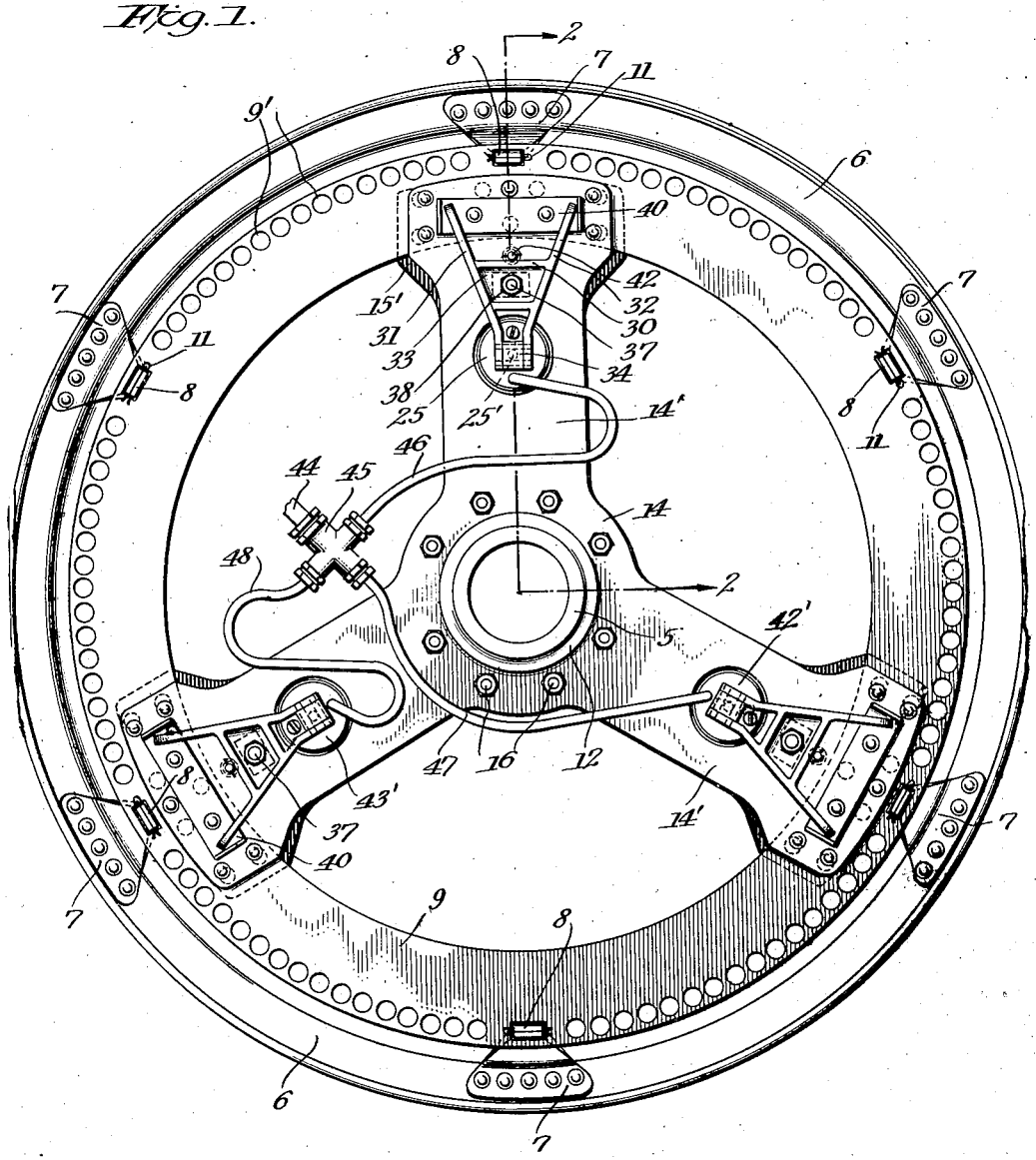

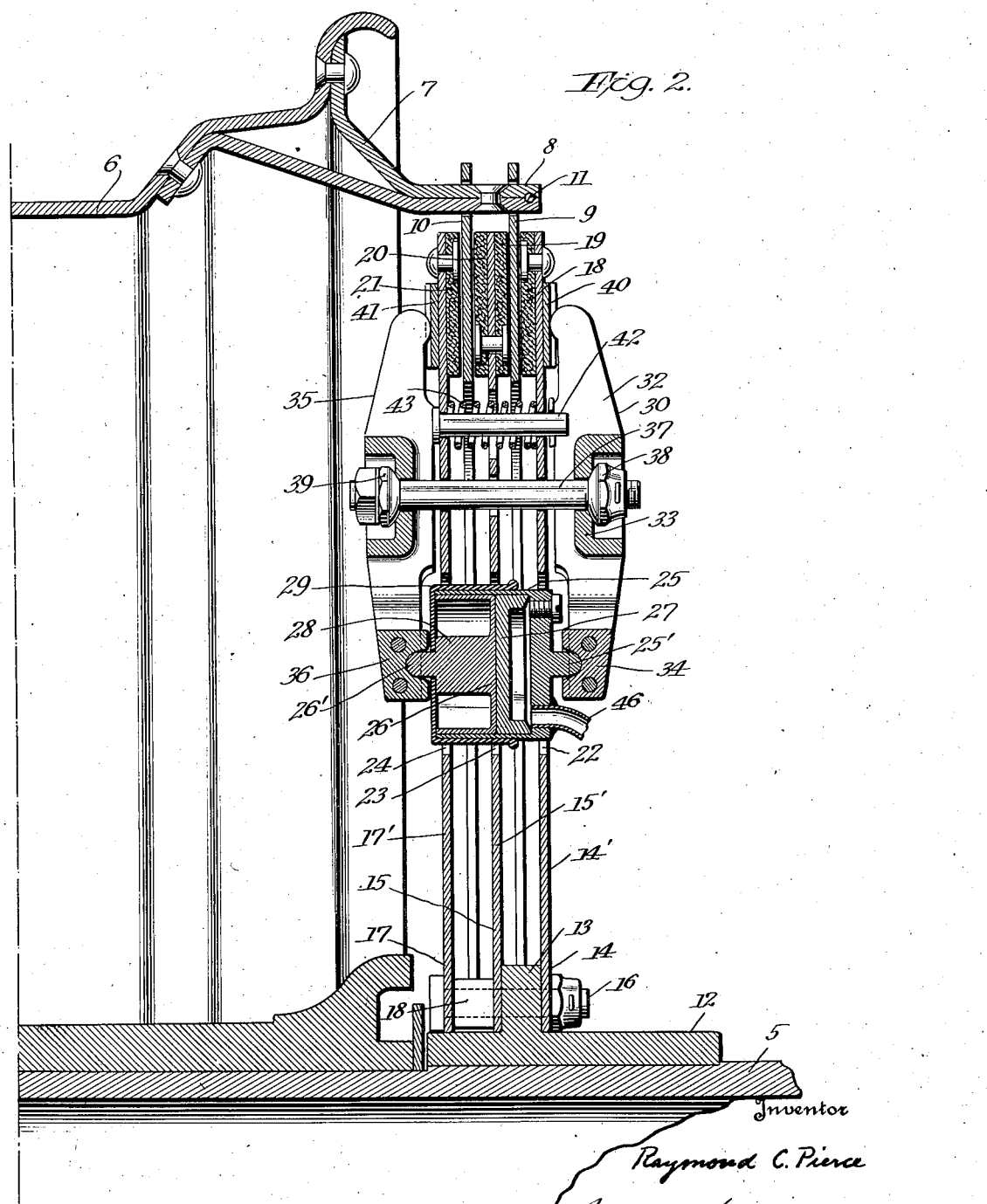

Patented Apr. 26, 1938

2,115,083

UNITED STATES PATENT OFFICE 2,115,083

BRAKE

Raymond C. Pierce, Bronxville, N. Y., assignor, by mesne assignments, to United Aircraft Corporation, a corporation of Delaware Application March 6, 1930, Serial No. 433,737

37 Claims. (Cl. 188—72)

The present invention relates to brakes of the multiple disc type. In the form illustrated these brakes are adapted among other things for application to the landing wheels of aircraft.

An object of the invention is the provision of a brake of extraordinary power and at the same time of relatively simple construction and light weight.

Other objects and advantages will be apparent from the specification and claims and from the accompanying drawings which illustrate what is now considered the preferred embodiment and in which Figure 1 is an elevation of the brake as applied to the axle and wheel hub elements of an aeroplane landing gear, and Figure 2 is an enlarged section on the line 2—2 of Figure 1.

Referring to the drawings, reference numeral 5 denotes a wheel axle and 6 a wheel element which may be any convenient part of the wheel, for example, it may be the rim on which the tire is placed, or it may be the hub. At intervals equi-angularly spaced about the wheel hub are secured a number of brackets 7, each of which presents a finger 8 of substantially rectangular section and projecting parallel to the axle. A pair of annular plates or discs 9 and 10 are provided with registering slots adapted to be engaged by the fingers 8. The fingers thus support discs 9 and 10 and secure them against relative rotation to the hub while permitting their relative adjustment or movement axially of the hub. Cotter pins 11 retain the discs 9 and 10 on the fingers 8.

On the axle 5 is keyed a collar 12 having a peripheral flange 13. A pair of three-armed plates 14 and 15 are bolted to flange 13 by means of bolts 16. A third three-armed plate 17 is mounted on collar 12 by means of the bolts 16 and spaced from plate 15 by means of washers 18 surrounding bolts 16.

The arms of plates 14, 15 and 17 are equi-angularly spaced and those of each plate are in substantial register with those of the other plates. At their outer or free ends the arms, as here shown, are circumferentially expanded. It will be noted from reference to Fig. 1 that the extremity of the arms of plate 15 is expanded further than those of the other plates. Inasmuch as only one series of registering arms is shown in Figure 2, and since all of the series are the same, those shown in Figure 2 are designated as 14', 15' and 17' respectively, and the description will proceed with particular reference to them.

It will be noted from Fig. 2 that the ends of the arms overlie annular discs 9 and 10 and are in alternated relation with the latter. Arm 14' has secured to the inner face of its extremity a strip 18 of friction material; the extremity of arm 15' has secured to its faces strips of friction material 19 and 20 and arm 17' has secured to its inner face a strip of friction material 21.

Free in apertures 22, 23 and 24 of plates 14', 15' and 17' is an expansible chamber device comprising essentially a cylinder 25 and a piston 26 slidable therein. A rubber packing cup 27 is disposed on the end of the piston and limits inward movement of the latter relative to the cylinder.

The head of cylinder 25 is provided exteriorly and centrally with a lug 25' having a chamfered extremity, while a boss 28 of piston 26 is provided with a central projecting lug 26' likewise having a chamfered extremity. A rubber cap 29 is fitted over the open end of cylinder 25 and provided with an opening through which lug 26' projects.

The reference numeral 30, Figure 1, denotes a lever comprising two angularly disposed side members 31 and 32 having their intermediate portions joined by an integral web 33. Between the converging ends of the side members is secured a block 34 recessed to fit rockably over the extremity of lug 25'. A similar lever 35 has a recessed block 36 rockably engaging the extremity of lug 26'. The web portion of each of the levers is provided with an aperture through which loosely extends a bolt 37 which also passes through suitably disposed apertures in plates 14', 15' and 17'. Bolt 37 is provided with nuts 38 and 39 having opposed spherical faces seated on conforming margins of the lever web portion apertures. The upper diverging ends of levers 30 and 31 bear against wear and distributing strips 40 and 41 secured to the outer faces of arms 14' and 17' respectively. A pin 42 is loosely retained in apertures in plates 14' and 17' and extends through a clearance in plate 15'. This pin is surrounded by a compression spring 43, interposed between plates 14' and 17', which tends to force the friction strips away from discs 9 and 10, thus forming the brake release.

The remaining series of registering arms are equipped with devices identical with those described with reference to Figure 2 and the expansible devices of these other arms are denoted at 42' and 43' respectively. The expansible chamber devices are adapted to be expanded by the introduction therein of fluid under pressure in the manner well known in hydraulic braking systems, and a suitable pedal or lever for supplying the pressure will be arranged for operation by the vehicle operator.

In Figure 1, reference numeral 44 denotes the main lead from the pressure generator, and 45 a distributing connection into which are connected tubes 46, 47 and 48 leading respectively to cylinder 25 and the annular cylinders of devices 42' and 43'. As here shown, connection 45 is eccentrically arranged relative to axle 5, but tubes 46, 47 and 48 are of equal length so that delivery to the expansible chamber devices will be uniform and their action simultaneous.

Upon the introduction of the pressure fluid into cylinder 25, it and piston 26 will be mutually displaced on a line parallel to axle 5. This displacement of parts 25 and 26 will cause levers 30 and 35 to swing about fulcrums 38 and 39 thus causing the outer ends of the levers to bear against plates 40 and 41 so that frictional braking contact will result between friction strips 18, 19, 20, 21 and discs 9 and 10. It has been found that the central arm 15' may be provided with greater friction surfaces than the outer arms without risk of unequal distribution of braking pressure and it is for this reason that the extremity of this arm is wider than the others. Upon relieving the hydraulic pressure, the brake is released by means of spring 43, other springs, of course, being provided in conjunction with the other expansible devices 42' and 43'. The action of spring 43 moves cylinder 25 and piston 26 together, this movement, as above mentioned, being limited by the cup 27. Due to spring 43, lugs 25' and 26' are always securely engaged in the recesses of blocks 34 and 36, this engagement, it will be noted, forming the sole support of the expansible chamber devices which are thus freely floating.

Discs 9 and 10, as has been pointed out are relatively movable to themselves and to fingers 8. The arms of plates 14', 15' and 17' have sufficient springiness to enable their ends to undergo adequate relative displacement. For the purpose of heat dissipation, discs 9 and 10 may be provided with marginal cut-outs, as indicated at 9', Figure 1.

Although the specific embodiment of the brake described herein is shown as having two rotating and three stationary plates, it is to be understood that the number of plates may be increased or decreased in accordance with the requirements of any particular construction and still be comprised within the scope of this application. The term set of plates as used herein is intended to comprise a set consisting of one or more plates, so that if but one rotating plate was required in any particular construction, that one plate would be the set of rotating plates.

While I have described a specific embodiment of my invention, it will be understood that I do not limit myself except as determined in the following claims.

I claim:

1. The combination with axle and wheel hub elements, of a set of radially disposed plates secured to each of said elements, the plates of one set being alternated with the plates of the other set, an expansible chamber device disposed within the hub element periphery, means for leading fluid under pressure to said device, and a lever system actuated upon expansion of said device to urge the plates of the one set into frictional braking contact with those of the other set.

2. The combination with axle and wheel hub elements, of a set of radially disposed plates secured to each of said elements, the plates of one set being alternated with the plates of the other set, an expansible chamber device disposed within the hub element periphery, means for leading fluid under pressure to said device, and a lever system comprising opposed levers actuated upon expansion of said device to urge the plates of the one set into frictional braking contact with those of the other set.

3. The combination with axle and wheel hub elements, of a set of radially disposed plates secured to each of said elements, the plates of one set being alternated with the plates of the other set, a plurality of expansible chamber devices equi-angularly spaced about the axle element within the hub element periphery, means for leading fluid under pressure simultaneously to said devices, and a lever system associated with each of said devices actuated upon expansion thereof to exert compressive pressure on the two sets of plates at equi-angularly spaced areas thereon.

4. The combination with axle and wheel hub elements, of a set of radially disposed plates secured to each of said elements, the plates of one set being alternated with the plates of the other set, a plurality of expansible chamber devices equi-angularly spaced about the axle element within the hub element periphery, means for leading fluid under pressure simultaneously to said devices, and a lever system associated with each of said devices actuated upon expansion thereof to exert compressive pressure on the two sets of plates at equi-angularly spaced areas thereon, each of said lever systems comprising opposed levers disposed at the outside of the two plate sets.

5. The combination with axle and wheel hub elements, of a set of radially disposed plates secured to each of said elements, the plates of one set being alternated with the plates of the other set, an expansible chamber device expansible on a line parallel to the axle element and disposed within the hub element periphery, means for leading fluid under pressure to said device, and a lever system actuated upon expansion of said device to urge the plates in one set into frictional braking contact with those of the other set.

6. The combination with axle and wheel hub elements, of a set of radially disposed plates secured to each of said elements, the plates of one set being alternated with the plates of the other set, a floating expansible chamber device expansible on a line parallel to the axle element and disposed within the hub element periphery, means for leading fluid under pressure to said device, and a lever at each end of said device actuated upon expansion thereof to compress the two plate sets between them.

7. The combination with axle and wheel hub elements, of a set of radially disposed plates secured to each of said elements, the plates of one set being alternated with the plates of the other set, a plurality of expansible chamber devices expansible on lines parallel to the axle element and disposed within the hub element periphery, said devices being equi-angularly spaced about the axle element, means for leading fluid under pressure simultaneously to said devices, and a lever system associated with each of said devices actuated upon expansion thereof to exert compressive pressure on the two sets of plates at equi-angular areas thereon.

8. The combination with axle and wheel hub elements, of a set of radially disposed plates secured to each of said elements, the plates of one set being alternated with the plates of the other set, a plurality of floating expansible chamber devices, expansible on lines parallel to the axle element and disposed within the hub element periphery, said devices being equi-angularly spaced about the axle element, means for leading fluid under pressure simultaneously to said devices, and a lever at each end of each of said devices actuated upon expansion of the latter to compress the two plate sets between them.

9. The combination with axle and wheel hub elements, of a set of annular plates disposed in radial relation to the axle element and secured to the hub element against relative rotation to the latter, said plates being relatively adjustable in their axial direction, a set of plural-armed plates secured to the axle element in radial relation thereto, the arms of said plates being equi-angularly spaced and those of each plate being in substantial register with those of the other plates, the free ends of said arms overlying said annular plates and being alternated therewith, and means for simultaneously urging the ends of the arms and said annular plates into frictional braking contact.

10. The combination with axle and wheel hub elements, of a set of annular plates disposed in radial relation to the axle element and secured to the hub element against relative rotation to the latter, said plates being relatively adjustable in their axial direction, a set of plural-armed plates secured to the axle element in radial relation thereto, the arms of said plates being equi-angularly spaced and those of each plate being in substantial register with those of the other plates, the free ends of said arms overlying said annular plates and being alternated therewith, the arm ends of an inner one of said plural-armed plates being broader than the arm ends of the outer plates, and means for simultaneously urging the ends of the arms and said annular plates into frictional braking contact.

11. The combination with axle and wheel hub elements, of a set of annular plates disposed in radial relation to the axle element and secured to the hub element against relative rotation to the latter, said plates being relatively adjustable in their axial direction, a set of plural-armed plates secured to the axle element in radial relation thereto, the arms of said plates being equi-angularly spaced and those of each plate being in substantial register with those of the other plates, the free ends of said arms overlying said annular plates and being alternated therewith, and means acting in opposed directions parallel to the axle element for simultaneously urging the ends of the arms and said annular plates into frictional braking contact.

12. The combination with axle and wheel hub elements, of a set of annular plates disposed in radial relation to the axle element and secured to the hub element against relative rotation to the latter, said plates being relatively adjustable in their axial direction, a set of plural-armed plates secured to the axle element in radial relation thereto, the arms of said plates being equi-angularly spaced and those of each plate being in substantial register with those of the other plates, the free ends of said arms overlying said annular plates and being alternated therewith, an expansible chamber device supported in each series of said registering arms, means for leading fluid under pressure simultaneously to said devices, and a radially extending lever operable by each of said devices to urge the ends of the arms and the annular plates into frictional braking contact.

13. The combination with axle and wheel hub elements, of a set of annular plates disposed in radial relation to the axle element and secured to the hub element against relative rotation to the latter, said plates being relatively adjustable in their axial direction, a set of plural-armed plates secured to the axle element in radial relation thereto, the arms of said plates being equi-angularly spaced and those of each plate being in substantial register with those of the other plates, the free ends of said arms overlying said annular plates and being alternated therewith, an expansible chamber device carried in floating relation in each of said series of registering arms with its axis parallel to said axle element, means for leading fluid under pressure simultaneously to said devices, and a radially extending lever operable by each end of each of said devices to compress between them the ends of said arms and the annular plates.

14. The combination with axle and wheel hub elements, of a set of annular plates disposed in radial relation to the axle element and secured to the hub element against relative rotation to the latter, said plates being relatively adjustable in their axial direction, a set of plural-armed plates secured to the axle element in radial relation thereto, the arms of said plates being equi-angularly spaced and those of each plate being in substantial register with those of the other plates, the free ends of said arms overlying said annular plates and being alternated therewith, an expansible chamber device supported in each series of said registering arms and spaced from the free ends of the latter, means for leading fluid under pressure simultaneously to said devices, and a two-armed lever extending along each of said arm series, one of said devices being adapted to act on one end of each of said levers to swing the latter, the other end of each of said levers overlying the extremity of its associated arm series.

15. In a brake, a set of fixed plates and a set of revoluble plates in alternated arrangement, a pair of opposed levers pivotally supported from the fixed plates, an expansible chamber device supported by the opposite ends of the respective levers, means for leading fluid under pressure to said devices to expand the latter and swing the levers to bring their other opposite ends into compressive engagement with the two sets of plates, and means yieldingly opposing the expansion of said device.

16. The combination with a wheel hub, of a plurality of brackets secured thereto and presenting portions extending parallel to the hub axis, and a plurality of friction plates having perforations engaged by said portions, whereby the plates are secured against rotation relative to the hub but are capable of relative axial adjustment.

17. In a brake having alternately arranged rotating and stationary plates, means for forcing said plates into braking relation, comprising a pair of opposed levers and a tension member connecting said levers on which said levers may oscillate.

18. In a brake having alternately arranged rotating and stationary plates, means for forcing said plates into braking relation, comprising a pair of opposed levers, a tension member on which said levers may oscillate and means for adjusting the effective length of the tension member, whereby the brake may be adjusted for wear.

19. In a brake having alternately arranged rotating and stationary plates having braking surfaces, a lever supported by at least one stationary plate for forcing the plates into braking relation, and expansible chamber means located between the braking surfaces and the axis of the rotating plates for operating said lever.

20. In a brake having alternately arranged rotating and stationary plates, a lever supported by at least one stationary plate for forcing the plates together and expansible means supported by the lever for operating said lever.

21. In a brake having alternately arranged rotating and stationary plates, a lever supported by at least one stationary plate for forcing the plates together, an adjustable tension member on which said lever may oscillate and expansible means for operating said lever.

22. In a brake having alternately arranged rotating and stationary plates, a lever supported by at least one stationary plate between the periphery and axis of a rotating plate for urging the plates into braking relation and expansible means arranged in an aperture in the stationary plates for operating said lever.

23. In a brake, in combination alternately arranged plates, comprising a set of stationary plates and a set of rotating plates, braking surfaces associated with said plates, one set of said plates having portions thereof removed whereby portions of the braking surfaces associated with the other plates are exposed and means for forcing said plates into braking relation.

24. In a combination with axle and wheel elements of a set of plates secured to the axle element and a set of plates secured to the wheel element, means for urging the plates into contact to produce a braking effect, perforations in the set of elements secured to the wheel, a plurality of brackets secured to the wheel rim, fingers projecting from said brackets and adapted to project into said perforations whereby the perforated plates are secured to the wheel element and the braking force is transmitted from the wheel rim to the axle element and the set of plates secured to the wheel element may move axially.

25. The combination with axle and wheel elements, of a brake having plates, comprising a set of stationary plates and a set of rotating plates, one set of said plates having cut-outs whereby portions of the other plates are exposed, a bracket attached to the wheel element for securing one set of said plates to the wheel element, said bracket extending outwardly from said wheel so that the entire set of plates is supported in an exposed position and means for forcing said plates into braking relation.

26. In a brake, a set of rotating and a set of stationary plates, a pair of opposed levers mounted on one set of said plates, a tension member connecting said levers, means for separating the adjacent ends of said levers to cause them to oscillate on the tension piece, and to bring the opposite ends of the levers into compressive engagement with said plates, said levers, said tension piece, said separating means, and said plates forming a unit adapted to absorb all the axial forces, incident to bringing the two series of plates into compressive engagement.

27. In a brake, a set of fixed plates and a set of revolvable plates in alternated arrangement, a pair of opposed levers pivotally supported from one of the sets of plates, an expansible device supported by adjacent ends of the respective levers, means for expanding said expansible device to swing the levers to bring their other adjacent ends into compressive engagement with the two sets of plates and means yieldingly opposing the expansion of said device.

28. A device, as described in claim 27, in which the levers swing upon a tension piece connecting them and in which the yielding means is adapted to separate the plates to release the brake as well as hold said levers in position upon the tension pieces, collapse said expansible device and hold said expansible device in position on the lever ends.

29. A brake, comprising a rotatable part and a non-rotatable part, braking elements associated respectively with the parts, the elements associated with the non-rotatable part having a plurality of radial arms supporting braking surfaces and means operating on the arms for effecting movement of certain of the braking elements axially of the assembly into frictional engagement with other of the braking elements to brake the rotatable part.

30. A brake, comprising a rotatable part and a non-rotatable part, brake elements associated respectively with the parts, the elements associated with the non-rotatable part having a plurality of arms radiating from a central structure, said central structure secured to the non-rotatable part, means operating on the arms for effecting movement of certain of the braking elements axially of the assembly into frictional engagement with other of the braking elements to brake the rotatable part.

31. In a brake, in combination, a set of plates having substantially continuous braking surfaces associated therewith, another set of plates having interrupted braking surfaces associated therewith and alternating with said first mentioned plates and means supported by said other set of plates, within the periphery thereof, and acting thereon for forcing said interrupted braking surfaces into frictional engagement with said continuous braking surfaces.

32. In a brake, in combination, a set of annular discs, a set of plates alternated therewith, overlying said disc at spaced portions only, the remainder of said discs between the spaced portions being exposed, an expansible chamber device, means for leading fluid under pressure to said device, and a lever system actuated upon expansion of said device for forcing the portions of said plates overlying said discs into braking relation with said discs.

33. In a brake having alternately arranged rotating and non-rotating plates, a lever supported by at least one of the non-rotating plates for forcing the plates together, and expansible chamber means for operating said lever.

34. In a brake having alternately arranged rotating and non-rotating plates, a lever supported by at least one of the non-rotating plates for urging the plates into braking relation and expansible chamber means arranged in an aperture in at least one of the non-rotating plates for operating said lever.

35. A brake, comprising a rotatable part and a non-rotatable part, brake elements associated respectively with the parts, the elements associated with the non-rotatable part having a plurality of arms extending outwardly from a supporting structure, said supporting structure secured to the non-rotatable part, expansible chamber means operating on the arms for effecting movement of certain of the braking elements axially of the assembly in the frictional engagement with other of the braking elements to brake the rotatable part.

36. A brake comprising annular friction discs, fluid power devices located part-way toward the center from said discs, and a lever operated by each of said devices for actuating the discs.

37. A vehicle wheel comprising, in combination, an axle, a tire carrying member surrounding said axle, an axially disposed tire retaining flange on said tire carrying member, a friction member attached rigidly to said axle, a second friction member carried by said flange and fixed against rotation relative to the wheel, and means for causing a movement of said second friction member to cause it to coact with the first friction member and arrest the movement of the vehicle.

RAYMOND C. PIERCE.